United States Patent
Latzina (10) Patent No.: US 10,564,834 B2
(45) Date of Patent: Feb. 18, 2020

(54) USER INTERFACE ELEMENT CONSISTENCY ACROSS CLOUD-BASED APPLICATIONS

(71) Applicant: SAP SE, Walldorf (DE)

(72) Inventor: Markus Latzina, Wiesenbach (DE)

(73) Assignee: SAP SE, Walldorf (DE)

( * ) Notice: Subject to any disclaimer, the term of this patent is extended or adjusted under 35 U.S.C. 154(b) by 74 days.

(21) Appl. No.: 15/879,200

(22) Filed: Jan. 24, 2018

(65) Prior Publication Data

US 2019/0227702 A1   Jul. 25, 2019

(51) Int. Cl.
| | |
|---|---|
| *G06F 3/00* | (2006.01) |
| *G06F 3/0484* | (2013.01) |
| *G06F 9/451* | (2018.01) |
| *G06F 3/0482* | (2013.01) |
| *H04L 29/08* | (2006.01) |

(52) U.S. Cl.
CPC ........ *G06F 3/04847* (2013.01); *G06F 3/0482* (2013.01); *G06F 9/451* (2018.02); *H04L 67/10* (2013.01)

(58) Field of Classification Search
None
See application file for complete search history.

(56) References Cited

U.S. PATENT DOCUMENTS

| | | | | |
|---|---|---|---|---|
| 2005/0280844 A1* | 12/2005 | Ferlitsch | ............... | G06F 3/1204 358/1.9 |
| 2011/0202848 A1* | 8/2011 | Ismalon | ............... | G06F 17/2247 715/738 |
| 2015/0040015 A1* | 2/2015 | Jindal | ............... | H04L 51/32 715/735 |
| 2015/0242389 A1* | 8/2015 | Morrissey | ........... | G06F 16/2365 715/237 |
| 2017/0192985 A1* | 7/2017 | Fontes | ................. | G06F 16/958 |
| 2018/0232068 A1* | 8/2018 | Gordon | ............... | G06F 3/03545 |

OTHER PUBLICATIONS

Elaine Quintino da Silva, Developing Customizable Web-based Education Applications through a Component-based Framework, Jan. 1, 2005, IEEE Computer Society, pp. 1-6 (Year: 2005).*

Raphael M. Marcondes et al., Introducing adaptation templates to support the implementation of adaptive e-commerce applications, Nov. 1, 2017, IEEE Computer Society, pp. 243-248 (Year: 2017).*

* cited by examiner

*Primary Examiner* — Tam T Tran
(74) *Attorney, Agent, or Firm* — Mintz Levin Cohn Ferris Glovsky and Popeo, P.C.

(57) ABSTRACT

In some implementations, there is provided an apparatus having at least one data processor and at least one memory storing instructions which, when executed by the at least one data processor, cause requesting a configuration of a user interface element associated with a user interface of an application being executed at, or accessed by, the apparatus; presenting a configuration user interface to enable configuration of the user interface element, the configuration user interface including at least one option for configuring the user interface element and an indication of whether a selected option is to be applied at runtime, to just the application or a plurality of applications; and presenting, during runtime of at least the application, the user interface element in accordance with the at least one option and/or the indication selected via the configuration user interface. Related systems and articles of manufacture are also provided.

18 Claims, 10 Drawing Sheets

APPLICATION B 160B 230

| Make Name | Car make company.. |
| Model Name | Model name.. |
| Car Type | ○ Old ○ New  232 |
| Price Range | ○ Under €1000 |
| | ○ Between €1000 and €5000 |
| | ○ Between €5000 and €10,000  234 |
| | ○ Above €10,000 |
| Zipcode | Area.. |
| Gender | ○ Male ○ Female  236 |

Search

Request for a configuration of a UI element associated with a first application being executed at a user equipment  310

Present a configuration UI to enable configuration of the UE element  315

Receive a first input indicating a selection of a configuration option for the UI element  317

Receive a second input indicating whether the configuration of the UE element should be applied to just the application or to other applications  319

Present the UI element associated with the application(s) in accordance with the selected configuration  320

FIG. 3

Receive a request for configuration options associated with a UI element associated with an application  410

Provide the requested configuration options  415

Receive the configurations selected for the UI element and the associated application(s)  420

Provide information to an application's UI to enable the configuration of UIs in accordance with the received configurations  430

USER INTERFACE ELEMENT CONSISTENCY ACROSS CLOUD-BASED APPLICATIONS

TECHNICAL FIELD

The subject matter described herein relates generally to user interfaces.

BACKGROUND

The design of user interfaces is becoming a central problem for large, complex systems. User interfaces are the bridge between applications and users, and, as a result, have to cope with the complexities of both. With the advent of new technologies and user-centered concerns, the user interface portion of interactive systems is becoming increasingly large and complex. Faster and more capable machines and networks are providing users with more functionalities and more information, but at the same time overwhelming users (as well as the corresponding processors and networks) with more commands and options presented via the user interface.

SUMMARY

In some implementations, there is provided an apparatus having at least one data processor and at least one memory storing instructions which, when executed by the at least one data processor, cause requesting a configuration of a user interface element associated with a user interface of an application being executed at, or accessed by, the apparatus; presenting a configuration user interface to enable configuration of the user interface element, the configuration user interface including at least one option for configuring the user interface element and an indication of whether a selected option is to be applied at runtime, to just the application or a plurality of applications; and presenting, during runtime of at least the application, the user interface element in accordance with the at least one option and/or the indication selected via the configuration user interface.

In some variations, one or more features disclosed herein including the following features can optionally be included in any feasible combination. For the plurality of applications being executed at, or accessed by, the apparatus, other user interface elements may be presented in accordance with the at least one option and/or the indication selected via the configuration user interface. The requesting may include sending, to a server, a message including an identity of the user interface element being executed at, or accessed by, the apparatus. The message may be sent in response to an indication of a graphical indicator being selected, wherein the graphical indicator triggers the configuration of the user interface element, and wherein the graphical indicator is presented adjacent to the user interface element to indicate that the user interface element is configurable by an end-user at runtime. A first input may be received, and the first input may correspond to the at least one option presented on the configuration user interface. Moreover, a second input may be received, and the second input may correspond to the indication of whether the selected option is to be applied to just the application or the plurality of applications, wherein the indication may be presented on the configuration user interface. At least the first input, the second input, and the identity of the user interface element may be sent to the server. The apparatus may receive, from the server and in response to the sending, information to enable presenting, at the apparatus, the configuration user interface. The configuration user interface may include a first element causing the selected option is to be applied to just the application, a second element causing the selected option is to be applied to the plurality of applications, a third element causing the select option to be applied to other user interface elements displayed on a same screen as the user interface of the application being executed at, or accessed by, the apparatus. The configuration user interface may include a fourth element causing the selected option to be applied to only the same type of user interface elements as the user interface of the application being executed at, or accessed by, the apparatus, and the configuration user interface may include a fifth element causing the selected option to be applied to similar types of user interface elements as the user interface element of the application being executed at, or accessed by, the apparatus.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Consistency among user interfaces is an issue in the domain of user interfaces. Consistency may be considered a user interface characteristic which seeks to have the same types of information presented in the same or similar way across the application's user interface(s). This information may include user interface elements for receiving user input and/or presenting system output to users. The consistency of the user interface may pertain to the general look-and-feel of the user interface and the specific types of graphical user interfaces elements for the manipulation or presentation of information.

With the advent of cloud computing, user interface consistency is even more of an issue. For example, an end-user may, as part of performing a task or workflow, have to access dozens of applications, each of which may have one, if not many, user interfaces. These applications may be from different vendors, provide different functions, and/or correspond to different releases cycles from the same vendor or provider. As such, the end-user is likely faced with the prospect of inconsistency among the user interfaces across various applications or application parts (e.g. distributed across multiple screens or pages). These inconsistencies can lead to an increase in the burden on users, processors, and networks.

In some implementations, there is provided a way to provide consistency among user interfaces across one or more applications.

Figure 1:
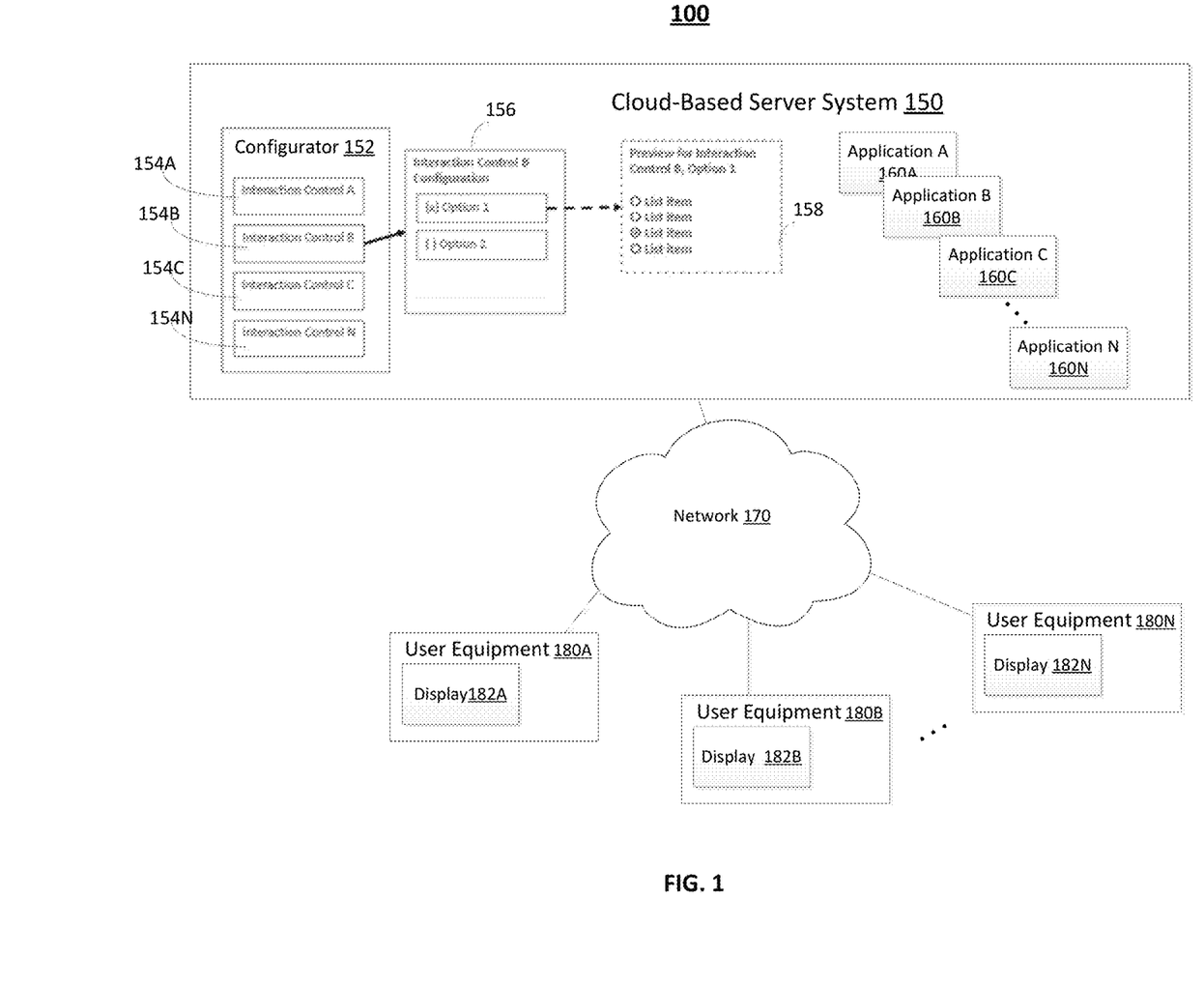
FIG. 1 depicts an example of a system for providing user interface consistency, in accordance with some implementations.

FIG. 1 depicts an example of a system 100, in accordance with some implementations. The system 100 may include a cloud-based server system 150 (referred to herein also as the "server") coupled to a network 170 (e.g., the Internet, a wireless network, an intranet, other types of communication media, or a combination thereof). The user equipment 180A may couple to the server 150 via the network 170 to obtain or access at least one cloud-based application (also referred to herein as the "application") 160A-N. These applications 160A-N may be accessed by a user equipment (and executed at the server 150) and/or may be downloaded and executed at a corresponding user equipment.

The user equipment, such as user equipment 180A-N, may be implemented as a computer, a tablet, a smartphone, a cellphone, an Internet of Things (IoT) device, and/or other types of devices, which may include, or be coupled to, a display, such as displays 182A-N, upon which a user interface can be presented. The user interfaces may provide user interface views (also referred to as user interfaces) for the application currently being accessed, executed, and/or viewed at the user equipment. For example, user equipment 180A may be accessing a cloud-based application 160A, which may provide at least one user interface for a corresponding application. It is via the user interface that interaction (e.g., selection, data input, and/or the like) with the application may take place.

Figure 2A:
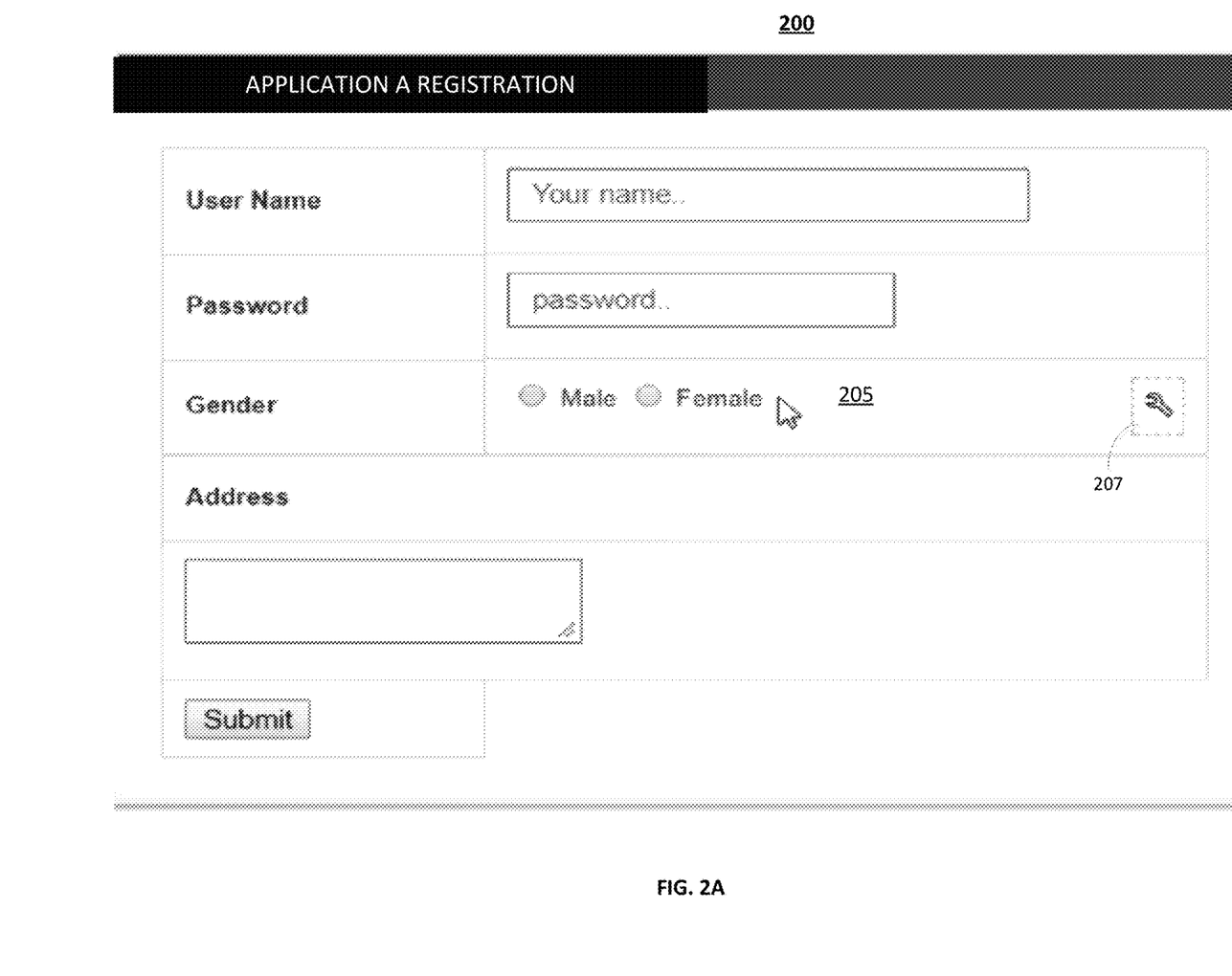
FIGS. 2A-2D depict examples of user interfaces, in accordance with some implementations.

FIG. 2A depicts an example of a user interface 200 corresponding to application A 160A. The user interface 200 may be presented at display 182A, during runtime when the user equipment is accessing or executing application 160A. In the example of FIG. 2A, the user interface 200 may include graphical user interface elements (also referred to as "user interface elements" or "elements") for user name, password, gender 205, address, and/or the like. The gender user interface element 205 is a selection element enabling a selection from among a group of choices. The user interface element 205 is a selection element enabling a selection from among a group of choices, which in this example is related to the gender attribute, although other types of attributes may be configured as well (e.g., car type at FIG. 2C).

Referring again to FIG. 1, the configurator 152 may allow configuration of a user interface element for a current application being executed or being accessed. In some implementations, the configurator may enable an end-user to, at runtime, configure for consistency the user interface element(s) residing on the same screen or page being viewed throughout a single application and/or across applications. Alternatively or additionally, the configurator 152 may allow configuration of a user interface element across some, if not all, applications being executed or being accessed. However, during design time the provider and/or vendor of the application(s) may enable whether certain user interface elements can be configured by the configurator 152 at runtime as disclosed herein. In this way, the end-user can control the consistency of the user interfaces being used across one or more applications and even across applications provided by different providers or vendors.

In the example of FIG. 1, the configurator 152 may allow the configuration of four user interface elements 154A-D. For a given user interface element 154B for example, the configuration 154B may provide two options 156 for that user interface element. When option 2 is selected for application 160A, the configurator 152 may provide application 160A with configuration information for option 2 to enable the application 160A to be rendered dynamically at runtime with option 2. In some implementations, applications may provide to server 150 (or a repository coupled to server 150) options for one or more user interface elements, so that during runtime applications can be rendered dynamically with a consistent interface as configured by the end-user via the configurator 152.

To illustrate further with reference to FIG. 1 and FIG. 2A, the user equipment 180A may be accessing and/or executing application A 160A at the server 150. The application 160A may have at least one user interface 200 as shown in FIG. 2A. In this example, the gender user interface element 205 (which represents configuration information for interaction control 154B) includes a selection between male and female (which represents two optional values for the attribute gender). And, element 205 includes a graphical indicator 207 to indicate that the associated element 205 is allowed to be configured, at runtime and by the end-user, for consistency by the options provided by the configurator 152.

In the example of FIG. 2A, the graphical indicator element 207 is adjacent to the user interface element 205 to indicate graphically that element 205 is allowed to be configured, at runtime and by the end-user (so elements without an adjacent graphical element 207 may not be configurable by configurator 152 as disclosed herein). The graphical indicator 207 may be selected, via the user interface 200, to enable the configuration of the gender user interface element 205. In some implementations, the graphical indicator 207 is only present on the user interface, when the adjacent graphical user interface element is enabled for runtime configuration as described herein.

When the graphical indicator 207 is selected for example, the configurator 152 may provide the different types (e.g., configuration options 154B and 156) of interaction control, which can be selected via a configuration user interface for the gender user interface element 205. These options 156 may be defined at 150 during design time of the applications 160A-N, so that at runtime of an application a user's selection of the graphical indicator 207 enables the proper configuration of the user interface element.

Figure 2B:
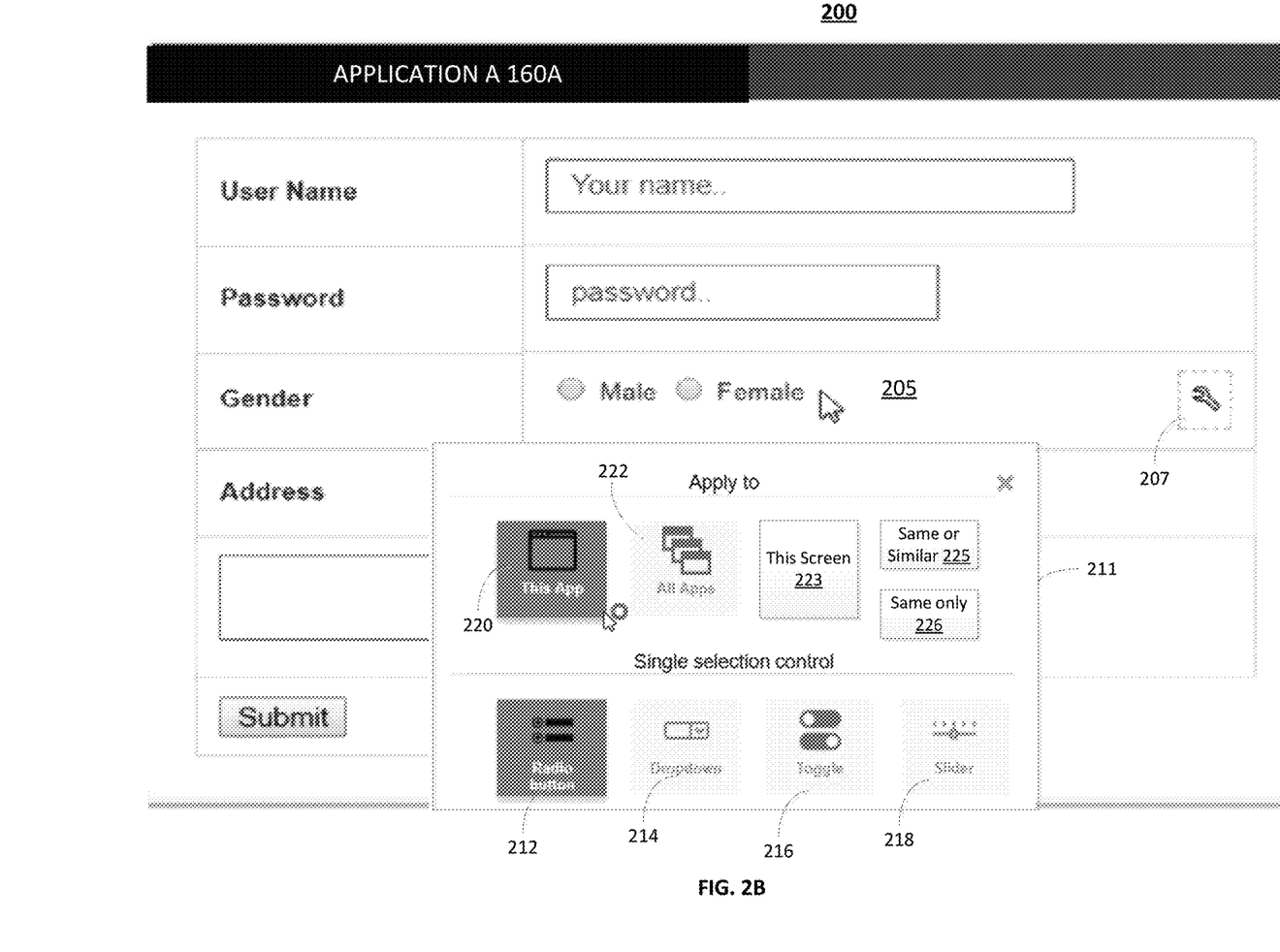

FIG. 2B illustrates an example of the interaction control options for selection. As noted, the user interface element options (while providing single selection, multiple selection, editing of tabular data, and/or the like) represent different variants of user interface design. For example, the layout or combined shapes of the user interface element parts which comprise the design of this user interface element, while preserving in each case the identical attributes and values of the information which is handled through any of these user interface elements.

During the runtime of the user interface 200 when a selection of the graphical indicator 207 is received for example, this selection may trigger a message (which may include an identifier of the application being configured) to be sent to the configurator, which triggers the configurator 152 to respond by providing for example the type options 156 for identified application, which in this example is the gender user interface element 205. In the current example, the type options include a radio button 212, drop down 214, toggle 216, slider 218, and/or other types of interaction or selection control, although other type of user interface elements may be provided.

In the example of FIG. 2B, the user interface element option which uses radio buttons 212 is selected via the configuration user interface 211. And, an indication of the selection may be sent as a message to the configurator 152. This message may also include the identity of the application. Had another option been selected, such as 214, 216, and/or the like, a corresponding indication would have been sent as a message to the configurator 152. In some implementations, the configuration user interface 211 is presented adjacent to, or on the same display screen as, the graphical user interface element being configured, which in this example is the gender element 205.

Although the previous example describes the graphical indicator 207 triggering the configuration user interface 211, at runtime and by the end-user, the configuration user interface 211 may be triggered in other ways as well. For example, the graphical indicator may be presented at the location of a configurable user interface element only after a previous trigger command by a user, thus displaying graphical indicators only by request and only for user interface elements which can be configured at all).

Although some of the examples refer to certain types of user interface elements, these are merely examples as other types, such as a pull down menu, a drop down list box, a pull down menu, and/or any other type of human to computer interface mechanism for input and/or output) may be used as well.

The configuration selected at 212 may also be applied to just the application A 160A. In the example of FIG. 2B, the "This App" 220 selection indicates that the configuration selected at 212 is applied to just the application A 160A. And, an indication of the just "This App" 220 can be sent to the configurator 152. In the case of "This App" 220 being selected, the radio button 212 configuration may be applied to some (if not all) user interfaces of the overall application 160A. Alternatively or additionally, when the "same only" element 226 is selected, the radio button 212 configuration may be applied to some (if not all) occurrences of only the same type of user interface element, such as the gender selection element 205, in the application 160A. Alternatively or additionally, when the "same or similar" element 225 is selected, the radio button 212 configuration may be applied to some (if not all) occurrences of the same or similar types of user interface elements, such as some if not all selection related user interface elements, in the application 160A. In this way, the configurator enables consistent user interfaces to be generated at a user equipment when it accesses or executes an application such as application 160A.

If however, all applications (labeled "All Apps") is selected at 222, the configuration selected at 212 may be applied to some (if not all) of the user interfaces of the applications 160A-N executed or accessed at user equipment 180A. Alternatively or additionally, when the "same only" element 226 is selected, the radio button 212 configuration may be applied to some (if not all) occurrences of only the same type of user interface element, such as the gender selection element 205, in applications 160A-N. Alternatively or additionally, when the "same or similar" element 227 is selected, the radio button 212 configuration may be applied to some (if not all) occurrences of the same or similar types of user interface elements, such as some if not all selection related user interface elements, in applications 160A-N. The selection 222 may be sent to the configurator 152.

If the "This Screen" element 223 is selected, the configuration selected at 212 may be applied to some (if not all) of the user interfaces displayed within the same display screen as the gender element 205. For example, the radio button selection 212 may be applied to other user interfaces presented at the same time with user interface 200 at display 182A. The selection 223 may be sent to the configurator 152.

Figure 2C:
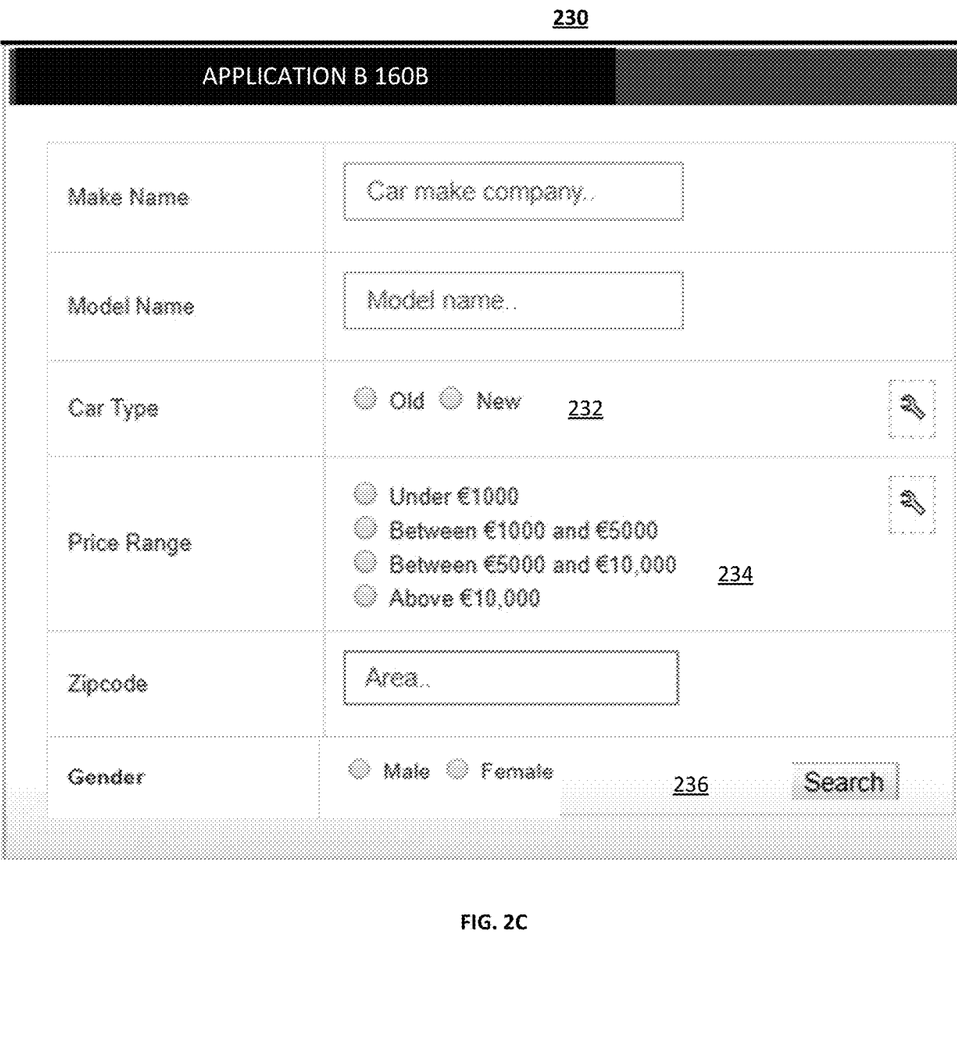

In some implementations, the configuration user interface 211 may enable selection of conditions for the application of the configuration of the user interface element. For example, the selection of radio buttons for the gender element 205 may have conditions which must be satisfied before the configuration is applied at runtime. To illustrate further, the option may specify that the radio button should be applied during certain times of day, when the user is logged in remotely or via a mobile device having a smaller screen, and/or the like. A condition may be mapped to a context. For example, a context defining a user-role may be mapped, at the configurator 152, to certain configuration options, such as options 156 and/or the like. Likewise, the context defining user equipment type may also be mapped, at the configurator 152, to certain configuration options. Likewise, a context defining a current environment associated with the user equipment (e.g., noisy, poor lightning, high rates of vibration, and/or shock) may be mapped, at the configurator 152, to certain configuration options. To illustrate further, the context information associated with the user operating the user equipment may represent metadata which can be used to define which options to provide for a given user interface element. Moreover, the mapping of context (or metadata) to options can be defined at design time for an application, and then provided, by the configurator 152, to a user equipment to enable the configuration of the user equipment. FIG. 2C depicts an example of a user interface 230 associated with the application 160B. In the example of FIG. 2C, the radio button 212 configuration was applied to "All Apps" 220 as shown at FIG. 2B. As can be seen, user interface includes radio buttons for the graphical user elements associated with a selection interaction with the user interface, such as car type 232, price range 234, and gender 236. In this way, the configurator 152 enables consistent user interfaces to be generated at a user equipment.

Figure 2D:
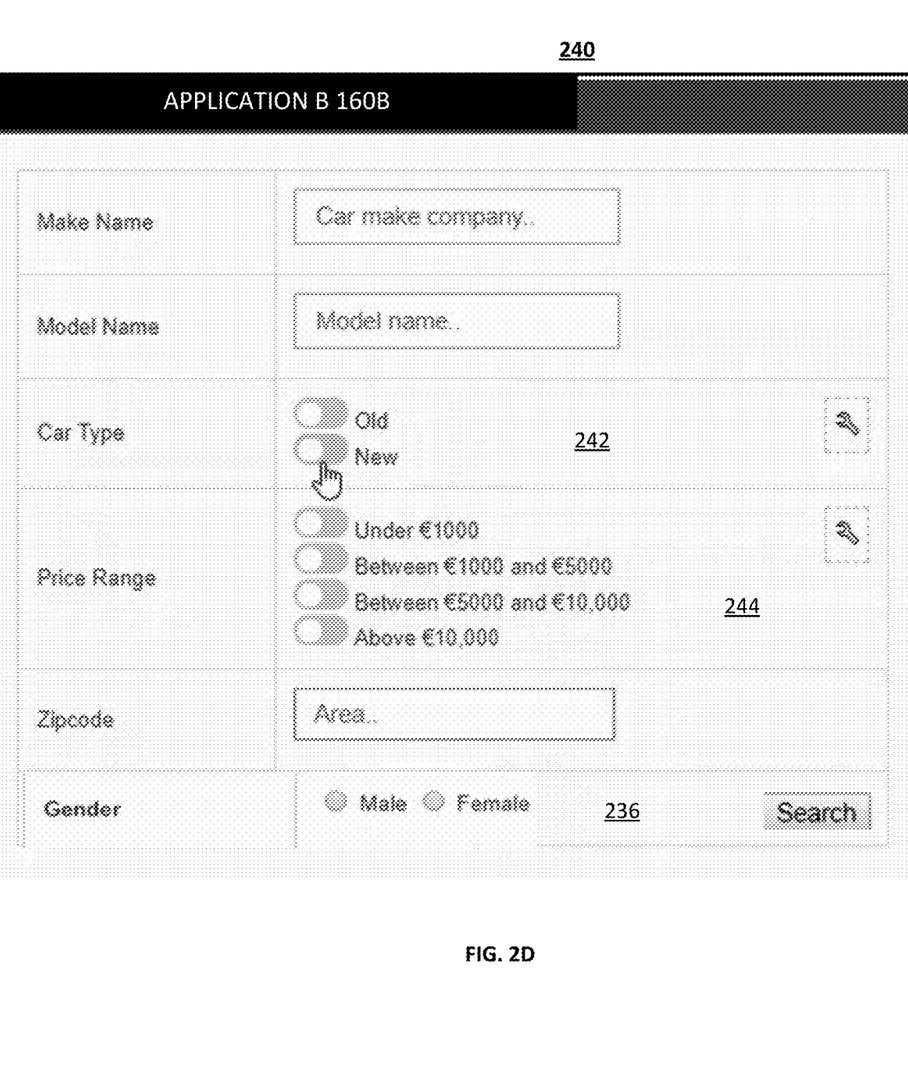

Alternatively or additionally, the radio button selection 212 may be applied to all occurrences of the gender selection in some (if not all) of the applications 160A-N, an example of which is shown in FIG. 2D. The gender user interface element 236 is configured as a radio button based on the selection 212 (FIG. 2A), but other selection types, such as toggle and/or the like, are used for the car type 242 and price range 244. In this way, the configurator enables consistent user interfaces to be generated at a user equipment.

In some implementations, the options selected via the configuration user interface may be applied by having the configurator 152 provide metadata to the corresponding application(s) being accessed, or executed, to enable the application(s) to make the user interface configurations for the end-user.

Figure 3:
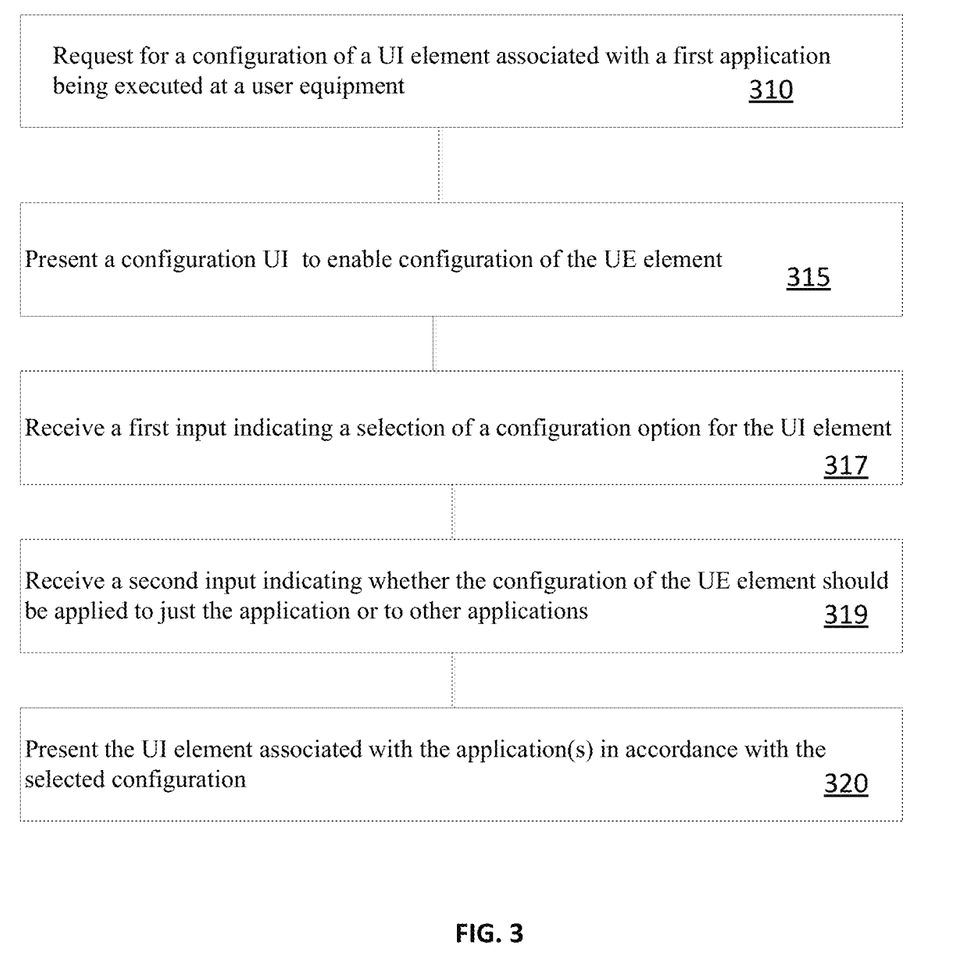
FIG. 3 depicts an example of a process flow for enabling user interface consistency, in accordance with some implementations.

FIG. 3 depicts a process 300 flow for a user equipment implementing user interface consistency, in accordance with some example implementations. The description of FIG. 3 also refers to FIGS. 1, 2A, and 2B.

At 310, a request is made for a configuration of a user interface element associated with a first application being executed at, or accessed by, a user equipment. For example, the user equipment 182A may be displaying 180A the user interface 200 associated with application 160A. To request configuration of the user interface element 205 (which in this example is the gender selection user interface element), the graphical user interface element 207 can be selected, via the user interface, to request the configuration of the user interface element 205. This selection may also trigger a message (which may include the identity of the application 160A and the identity of the user interface element 205) to be sent to the configurator 152, which in this example responds with the configuration options 156 (e.g., radio button, dropdown, and/or the like as noted above) for that element 205.

At 315, a configuration user interface may be presented to enable configuration of the user interface element 205. For example, the user equipment 180A may present the configuration user interface 211 shown at FIG. 2B. The configuration user interface 211 may include the options for configuring that specific user interface element 205 and the application 160A. In this example, these options include the radio button 212, drop down 214, toggle 216, slider 218, and/or other types.

Although the previous example refers to a selection user interface element, other types of user interface elements may be used as well. For example, checkboxes, toggle switches, drop down lists, data input fields, and/or any other type of user interface elements (or technique) may be used as well.

Moreover, the configuration user interface 211 may, as noted, enable configuration of whether the configuration of the user interface element should be applied to just the application 160A or to all other applications. For example, the "This App" 220 selection indicates that the configuration selected at 212 is to be applied to just the current application being configured, such as application A 160A. If the "All Apps" is selected at 222, the configuration selected at 212 may be applied to some (if not all) of the user interfaces of the applications 160A-N executed or accessed at user equipment 180. In some implementations, when the same only element 226 is selected, the configuration selected at 212 is applied to other occurrences of the same type graphical user interface element, such as all gender selection user interface elements, while in other implementations, when the same or similar element 225 is selected, the configuration selected at 212 is applied to other similar selection related user interface elements.

In some implementations, the user interface consistency control may be applied to user interface elements residing on the same screen or page (referred to herein as intra-screen). Alternatively or additionally, the user interface consistency control may be applied to user interface elements throughout a single application (referred to herein as intra-application). Alternatively or additionally, the user interface consistency control may be applied to user interface elements across applications (referred to herein as inter-application). In some implementations, the end-user may configure, via a user interface and/or at runtime, whether the selected configuration is intra-screen, intra-application, and/or inter-application.

At 317, a first input may be received indicating a selection of a configuration option for the user interface element and the application being configured. For example, the first input may be in response to a selection at configuration user interface 211 (FIG. 2B) of a radio button 212 option.

At 319, a second input may be received indicating whether the configuration of the user interface element should be applied to just the application 160A or to other applications. For example, the second input may be in response to a selection of configuration user interface 211 (FIG. 2B) of "This App" 210. The first input and/or the second input (along with the identity of the application and/or the identity of the user interface element being configured may be sent to the configurator 152.

During runtime of the application, the user interface element may, at 220, be presented at the user equipment configured in accordance with the configuration selected at 317 and 319. If for example, the user interface element 205 is configured for a radio button 212 option and is applied to "This App" 220 (and the same only 226 element), each time the user interface 200 is presented at application 160A, and the user interface 200 is presented with radio buttons for the gender user interface elements. Alternatively or additionally, the user interface element 205 (which is configured for the radio button and applied to just application 160A as indicated by the selection 220 and the same or similar 225 element) may be applied to all graphical user interface elements that require a selection type similar to the gender user interface element 205.

If however, the user interface element 205 is configured for the radio button 212 and applied to "All Apps" 222, each time a user interface is presented at user equipment 180A the user interface will be configured with radio buttons across all applications 160A-N. To illustrate further, if user equipment 180A accesses or is executing application 160B, the configurator 152 will indicate to application 160B to use radio buttons for selection of graphic user interface elements (and/or only gender selection user interface elements). Likewise, if the user equipment 180A accesses or is executing application 160C, the configurator 152 will indicate to application 160C to use radio buttons for selection of graphic user interface elements (and/or only gender selection user interface elements).

Moreover, if the user interface element 205 is configured for the radio button 212 and applied to "This Screen" 223, each time a user interface is presented at user equipment 180A the user interface will be configured with radio buttons when the user interface is presented on the same display 182A as the gender selection element 205.

Figure 4:
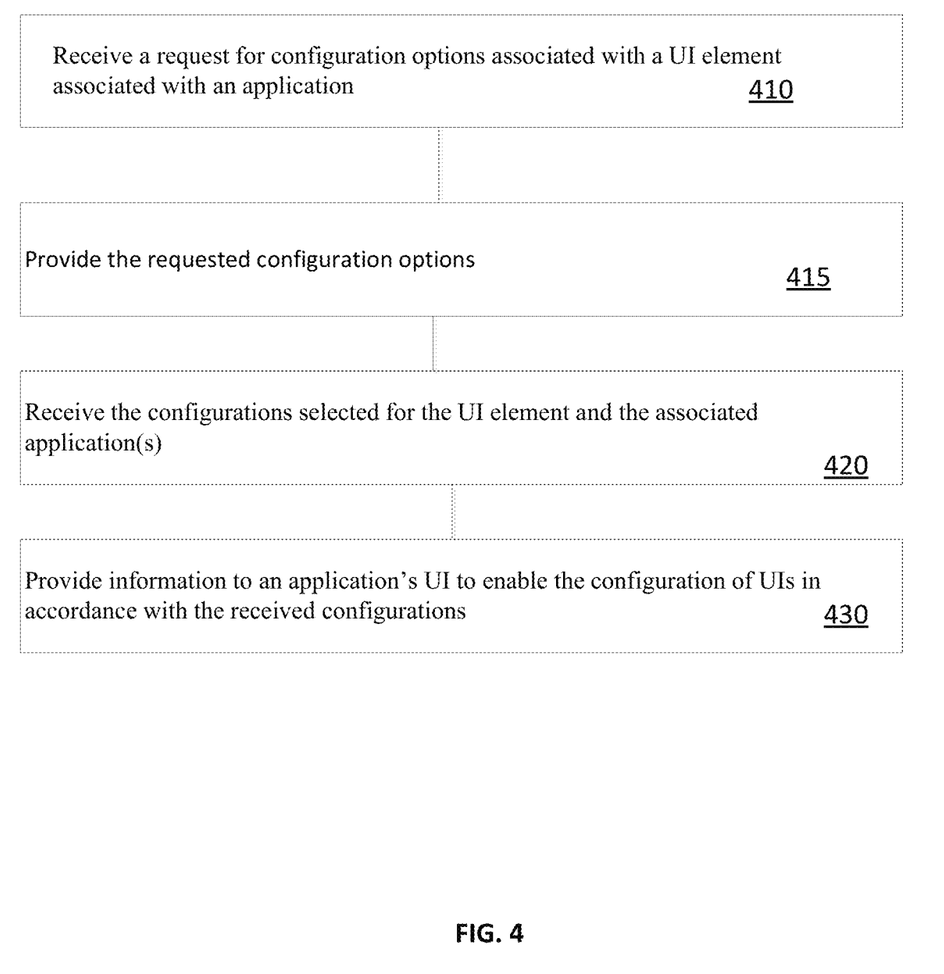
FIG. 4 depicts another example of a process flow for enabling user interface consistency, in accordance with some implementations.

FIG. 4 depicts a process 400 flow for a configurator 152 enabling user interface consistency, in accordance with some example embodiments. The description of FIG. 3 also refers to FIGS. 1, 2A, and 2B.

At 410, the configurator 152 may receive a request for configuration options associated with a user interface element associated with an application. For example, configurator 152 may receive a message from user equipment 180A, and the message may identify the application (which in this example is 160A) and identify the graphic user interface element (which in this example is the gender element 205) being configured as a result of the selection at 207 (FIG. 2A). For each application and corresponding graphical user interface, the configurator may identify the options for the configuration (see, e.g., 154B and 156). Referring again to the example of FIGS. 2A-2B, the gender element 205 may have interaction control options in the form of a radio button 212, drop down 214, toggle 216, slider 218, although other types of interaction control may be used as well. In some implementations, the options for each user interface element are kept in a repository at, or coupled, to the server 150. The repository may list for each application the application control elements 154A-N which can be configured via the configurator at runtime by an end-user. The repository may include metadata defining the options, such as 156, and the format for the option, such as 158. In some implementations, providers or vendors of the application may provide the information for the repository.

At 415, configurator 152 may provide the requested configuration options. For example, configurator 152 may provide the options to the user equipment 180A for display at 182A as the configurator user interface 211 to enable selection of the configuration. In some example implementations, the configuration may include a machine learning model, such as a neural network and/or other type of artificial intelligence, to propose options based on past behavior of the end-user (for example, past selections of user interface types by the users), the behavior of other end-users (for example, past selections of user interface types by other users), and/or the current context at the user interface (for example, the user interface element being configured as well as the other user interfaces at the application or screen/display).

At 420, the configurator 152 may receive the configurations selected for the user interface element and the associated application(s). In response to the selections described above 317 and 319, the configurator may receive a message including the selections. For example, the message may indicate that the gender user interface element is configured with a radio button 212 and this configuration is only to be applied to the application 160A.

In response to the received configuration at 420, the configurator 152 may provide information to an application's user interface controller to enable the configuration of user interfaces in accordance with the received configurations at 420. For example, the configurator 152 may send a message to application 160A that at user equipment 180A the radio button should be used for the gender user interface element and/or other selection related user interface elements. Supposing the configuration of radio button for example was for "All Apps" 222, the configurator 152 would then send a message to any application 160A-N being accessed or executed by user equipment 180A to indicate that the radio button should be used for the gender user interface element. This metadata may be fed back to a user via, for example, the configuration user interface 211.

Although the previous example refers to the "gender user interface element," this is merely an example as any type of user interface element which can be used for input and/or output at a user interface, such as radio button, a drop down, a toggle, a slider, and/or any other type of human computer interaction for input and/or output via the user interface.

In some cloud-based applications, the configurator's 152 user interface configuration information may be shared among applications (including applications from different providers or vendors) using a set of defined rules or standards. Alternatively or additionally, a provider or vendor of an application may register a user interface element in a common repository to enable configuring consistency. For each user interface element in the repository, the repository may include metadata regarding the purpose and/or contexts in which the user interface element is meant to be used. The metadata may include user feedback regarding user satisfaction or preference of the pertaining user interface element, resulting in an annotation or respective form of presentation to the end user (e.g., arranging configuration options in a particular order (of preference or the like)).

Although FIG. 1 shows the configurator 152 at the server 150, the configurator 152 may also operate, at least in part, at the user equipment to enable configuration of user interface(s) across at least on application being accessed or executed at the user equipment.

In some implementations, an end-user can configure a desired level of consistency among user interface elements, and this consistency can be provided dynamically at runtime. Moreover, this control can be implemented laterally across the applications the end-user may access, rather than having to force the end-user to, for example, cumbersomely navigate across disparate configuration user interfaces. To illustrate, when an application is being developed, the designer may specify, for one or more user interface elements, the type of interaction on a conceptual level, which may be independent from the user interface element's ultimate visual or graphical manifestation, such as the specific options provided for a given user interface element. To illustrate further, an end-user may be able to select from a plurality of options which match the requirements defined conceptually by the designer at design time. The options may be obtained from a registry or repository, and/or defined as well during design time. The specification of an interaction control on the conceptual level may be used in conjunction with a matching mechanism to evaluate whether a proposed alternative option for a given user interface element is a match or suitable given the general requirements for that element. For example, a usage description language (see, e.g., United States Patent Application 20150100905 Usage Description Language, filed Oct. 9, 2013) may be used evaluate whether there is a match between the requirement and all of the possible options for a given user interface element.

In a cloud-based implementation, the process described herein including process 300 and/or 400 may enable user interface configuration consistency and control. This configuration control may be performed as a cloud-based subscription service at server 150. When this is the case, an end-user may request to be notified about, for example, newly provisioned user interface control variants and/or to the amount of likes any user interface control variant received. Moreover, the user interface may present hints such as recommendations for suggested UI configuration control to improve consistency. In addition, the user interface may present feedback to indicate a degree of consistency for the user interface (e.g., within an application and/or across applications). Furthermore, analytics may be generated regarding which UI elements are preferred (or not preferred) to enable provisioning at other user interfaces.

During design time, software designers may run a report on user interface elements used, by type and default options applied. Before shipping or deploying the software/service, the software designers/engineers may make the design more consistent as a default with less effort, since they would be using preprogrammed parts (or, e.g., reuse components) rather than individually coding each single user interface element.

During design time and/or during runtime, administrators, or, for this purpose, "design facilitators" could configure the UIs on behalf of end users, taking into account their background knowledge about end users' tastes or preferences, with the basic goal of establishing or ensuring such high-level design criteria as user interface consistency. With some additional capabilities, such administrators could determine which user interface elements may be configured by end users or not (whether end users can override the defaults as provided by administrators). In any case, the degree of user interface consistency and user satisfaction, easy-of-use can be enhanced.

Figure 5A:
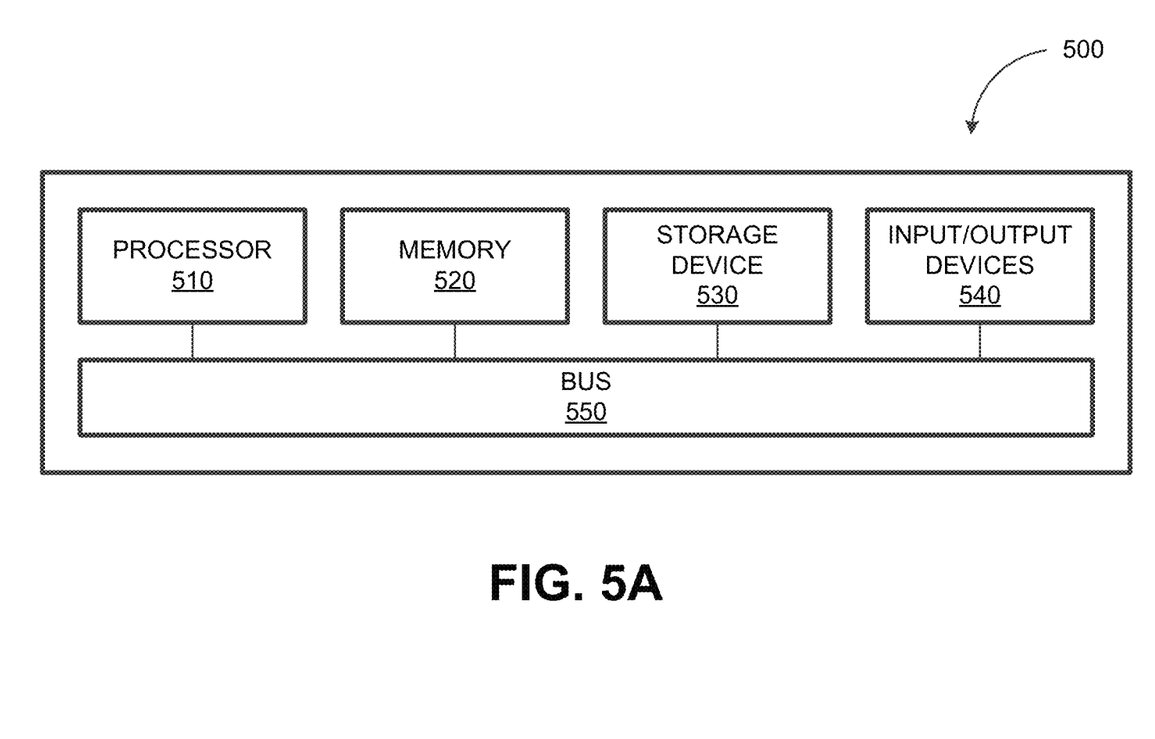
FIG. 5A depicts a block diagram illustrating a computing system, in accordance with some implementations.

FIG. 5A depicts a block diagram illustrating a computing system 500 consistent with implementations of the current subject matter. Referring to FIGS. 1 and 5, the server may comprise at least one computing system 500. Likewise, the user equipment may comprise at least one computing system.

As shown in FIG. 5A, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the configurator 152 and/or the user equipment 180A-N. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. Upon activation within the applications, the functionalities can be used to generate the user interface provided via the input/output device 540. The user interface can be generated and presented to a user by the computing system 500 (e.g., on a computer screen monitor, etc.).

Figure 5B:
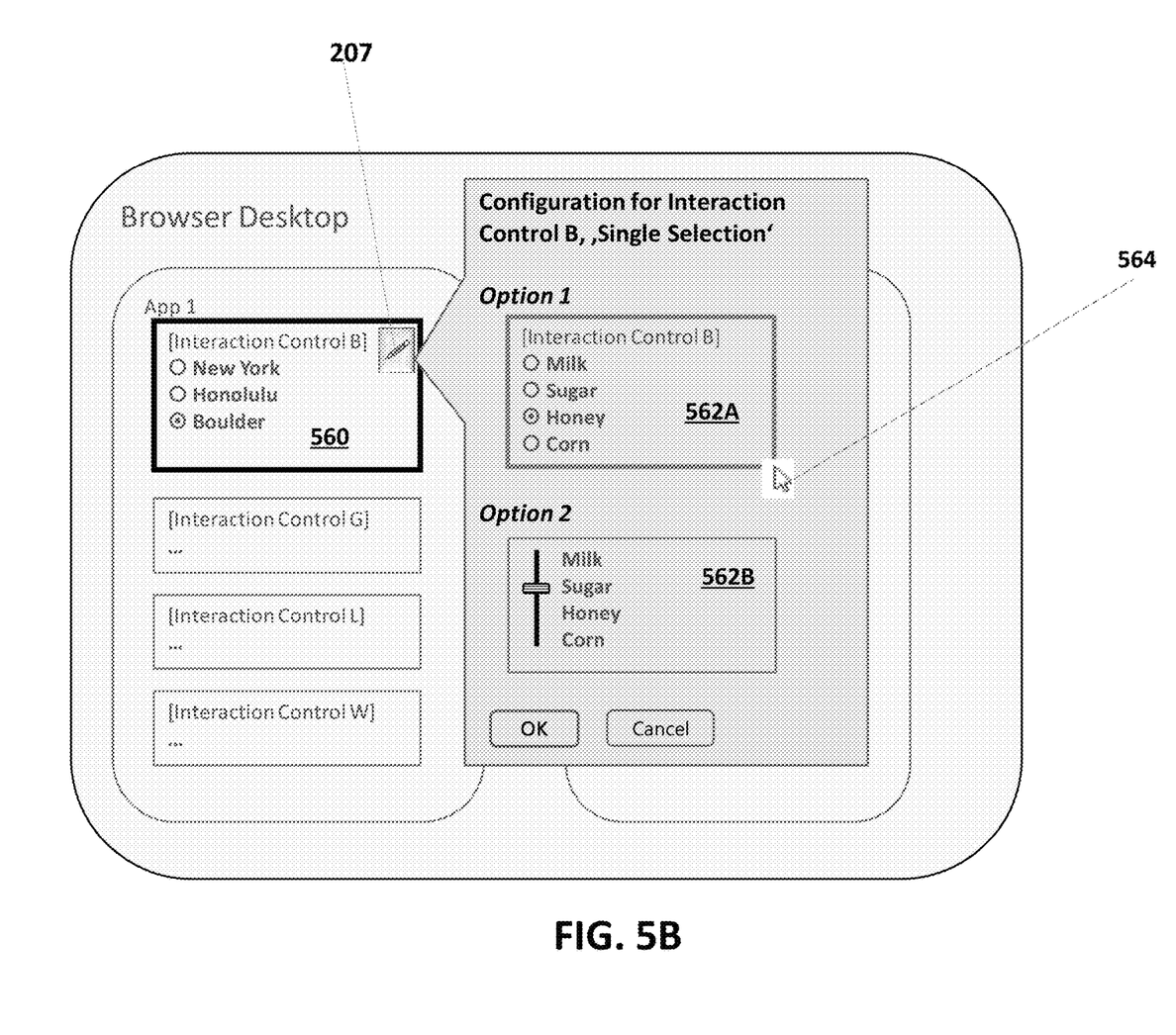
FIGS. 5B-5C depict additional examples, in accordance with some implementations.
Figure 5C:
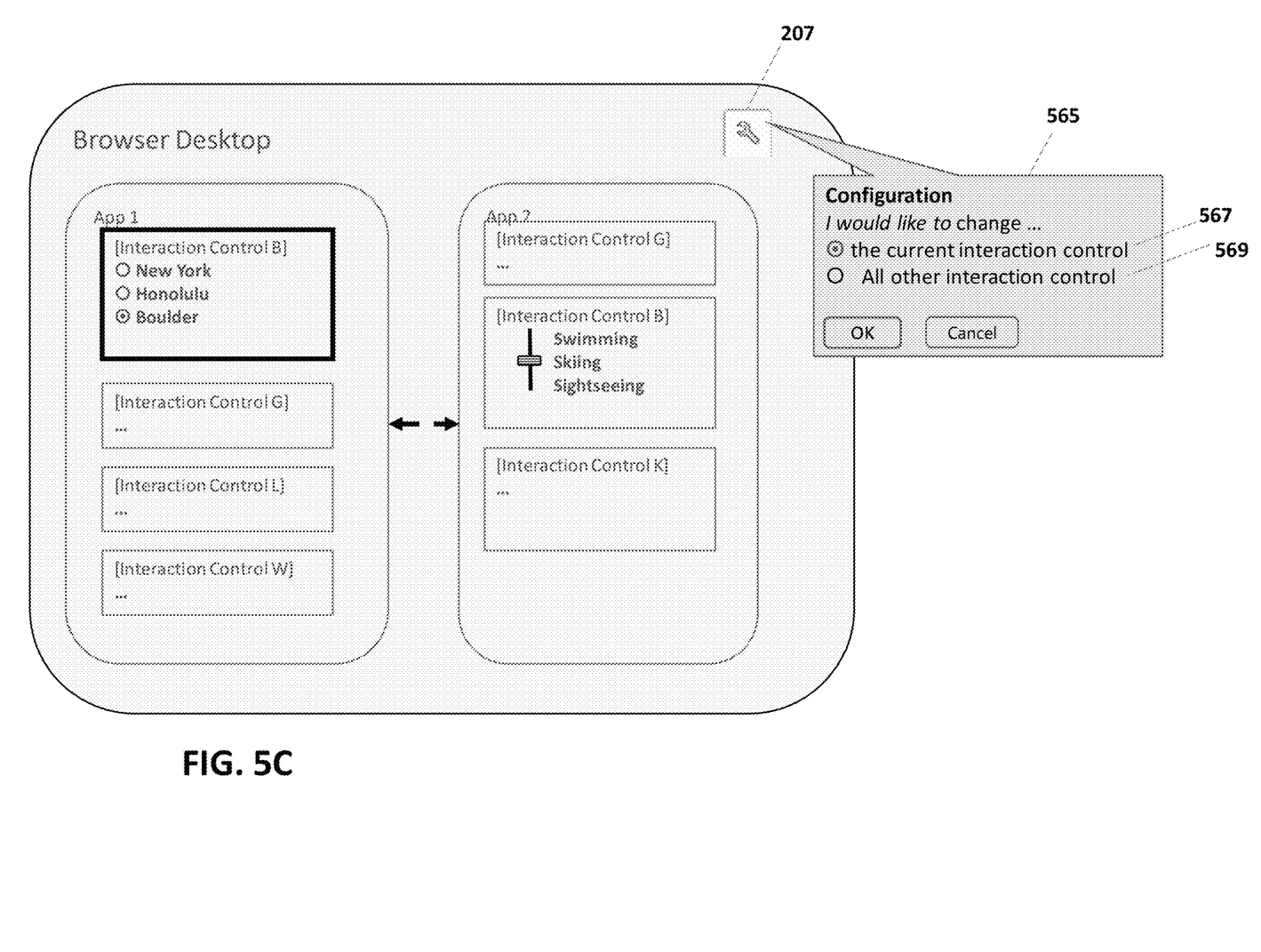

FIG. 5B depicts a user interface element 560 and the corresponding options 562A-B provided by the configurator 152. Here, the options are presented in response to selecting graphical indicator 207, which is included within element 560. FIG. 5B also shows selection at 564 of option 562A. FIG. 5C depicts the graphical indicator 207. Selecting the graphical indicator 207 also causes a selection of an indication 567/569 of how to apply the selection option. For example, is the selected option applied to only the current user interface element (as in indication 567) or to many user interface elements (as in indication 569).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus, comprising:
   at least one data processor; and
   at least one memory storing instructions which, when executed by the at least one data processor, cause operations comprising:
   requesting a configuration of a user interface element included in a user interface of an application being executed at, or accessed by, the apparatus;
   presenting a configuration user interface to enable configuration of the user interface element, the configuration user interface including at least one option for configuring the user interface element included in the user interface, wherein the configuration user interface includes a first element causing the at least one option to be applied to just the application, a second element causing the at least one option to be applied to a plurality of applications, a third element causing the at least one option to be applied to other user interface elements displayed on a same screen as the user interface of the application being executed at, or accessed by, the apparatus, and a fourth element causing the at least one option to be applied to only the same type of user interface elements as the user interface of the application being executed at, or accessed by, the apparatus;
   selecting the at least one option and at least one of the first element, the second element, the third element, and the fourth element; and
   presenting, during runtime of at least the application, the user interface element included in the user interface, the presenting in accordance with the selected at least one option and the selected at least one of the first element, the second element, the third element, and the fourth element.

2. The apparatus of claim 1 further causing operations comprising:
   presenting, for the plurality of applications being executed at, or accessed by, the apparatus, other user interface elements in accordance with the selected at least one option and the selected at least one of the first element, the second element, the third element, and the fourth element.

3. The apparatus of claim 1, wherein the requesting further causes operations comprising:
   sending, to a server, a message including an identity of the user interface element being executed at, or accessed by, the apparatus.

4. The apparatus of claim 3, wherein the message is sent in response to an indication of a graphical indicator being selected, wherein the graphical indicator triggers the configuration of the user interface element, and wherein the graphical indicator is presented adjacent to the user interface element to indicate that the user interface element is configurable by an end-user at runtime.

5. The apparatus of claim 4, further causing operations comprising:
   sending, to the server, information representative of the identity of the user interface element, the selection of the at least one option, and the selection of at least one of the first element, the second element, the third element, and the fourth element.

6. The apparatus of claim 5, further causing operations comprising:
   receiving, from the server and in response to the sending, configuration information to enable presenting, at the apparatus, the user interface element included in the user interface.

7. The apparatus of claim 1, wherein the configuration user interface includes a fifth element causing the selected at least one option to be applied to similar types of user interface elements as the user interface element of the application being executed at, or accessed by, the apparatus.

8. A method, comprising:
requesting a configuration of a user interface element associated with a user interface of an application being executed at, or accessed by, a user equipment;
presenting a configuration user interface to enable configuration of the user interface element, the configuration user interface including at least one option for configuring the user interface element included in the user interface, wherein the configuration user interface includes a first element causing the at least one option to be applied to just the application, a second element causing the at least one option to be applied to a plurality of applications, a third element causing the at least one option to be applied to other user interface elements displayed on a same screen as the user interface of the application being executed at, or accessed by, the user equipment, and a fourth element causing the at least one option to be applied to only the same type of user interface elements as the user interface of the application being executed at, or accessed by, the user equipment;
selecting the at least one option and at least one of the first element, the second element, the third element, and the fourth element; and
presenting, during runtime of at least the application, the user interface element included in the user interface, the presenting in accordance with the selected at least one option and the selected at least one of the first element, the second element, the third element, and the fourth element.

9. The method of claim 8 further comprising:
presenting, for the plurality of applications being executed at, or accessed by, the user equipment, other user interface elements in accordance with the selected at least one option and the selected at least one of the first element, the second element, the third element, and the fourth element.

10. The method of claim 8, wherein the requesting further comprises:
sending, to a server, a message including an identity of the user interface element being executed at, or accessed by the user equipment.

11. The method of claim 10, wherein the message is sent in response to an indication of a graphical indicator being selected, wherein the graphical indicator triggers the configuration of the user interface element, and wherein the graphical indicator is presented adjacent to the user interface element to indicate that the user interface element is configurable by an end-user at runtime.

12. The method of claim 11, further comprising:
sending, to the server, information representative of the identity of the user interface element, the selection of the at least one option, and the selection of at least one of the first element, the second element, the third element, and the fourth element.

13. The method of claim 12, further comprising:
receiving, from the server and in response to the sending, configuration information to enable presenting, at the user equipment, the user interface element included in the user interface.

14. The method of claim 8, wherein the configuration user interface includes a fifth element causing the selected option to be applied to similar types of user interface elements as the user interface element of the application being executed at, or accessed by the user equipment.

15. A non-transitory computer-readable storage medium which when executed by at least one processor causes operations comprising:
requesting a configuration of a user interface element associated with a user interface of an application being executed at, or accessed by, a user equipment;
presenting a configuration user interface to enable configuration of the user interface element, the configuration user interface including at least one option for configuring the user interface element included in the user interface, wherein the configuration user interface includes a first element causing the at least one option to be applied to just the application, a second element causing the at least one option to be applied to a plurality of applications, a third element causing the at least one option to be applied to other user interface elements displayed on a same screen as the user interface of the application being executed at, or accessed by, the user equipment, and a fourth element causing the at least one option to be applied to only the same type of user interface elements as the user interface of the application being executed at, or accessed by, the user equipment;
selecting the at least one option and at least one of the first element, the second element, the third element, and the fourth element; and
presenting, during runtime of at least the application, the user interface element included in the user interface, the presenting in accordance with the selected at least one option and the selected at least one of the first element, the second element, the third element, and the fourth element.

16. The non-transitory computer-readable storage medium of claim 15 further causing operations comprising:
presenting, for the plurality of applications being executed at, or accessed by, the user equipment, other user interface elements in accordance with the selected at least one option and the selected at least one of the first element, the second element, the third element, and the fourth element.

17. The non-transitory computer-readable storage medium of claim 15 further causing operations comprising:
sending, to a server, a message including an identity of the user interface element being executed at, or accessed by, the user equipment.

18. The non-transitory computer-readable storage medium of claim 17, wherein the message is sent in response an indication of a graphical indicator being selected, wherein the graphical indicator triggers the configuration of the user interface element, and wherein the graphical indicator is presented adjacent to the user interface element to indicate that the user interface element is configurable by an end-user at runtime.

* * * * *